Oct. 15, 1963    C. S. MERTLER    3,107,288
TEMPERATURE SENSING UNIT
Filed March 2, 1960    2 Sheets-Sheet 1

INVENTOR.
CHARLES S. MERTLER
BY Woodling and Krost,
ATTORNEYS

INVENTOR.
CHARLES S. MERTLER
BY *Woodling and Krost,*
ATTORNEYS

3,107,288
TEMPERATURE SENSING UNIT
Charles S. Mertler, Mansfield, Ohio, assignor to Stevens Manufacturing Company, Inc., a corporation of Ohio
Filed Mar. 2, 1960, Ser. No. 12,408
10 Claims. (Cl. 219—37)

The invention relates in general to a temperature sensing unit and more particularly to the electrical and physical arrangement of a temperature sensing unit which may be used with an electrical heating device. In household ranges surface units are employed to heat vessels, and in recent years surface units have come into use wherein the heat output is controlled according to the temperature of the vessel. This permits various degrees of heat for different cooking needs and most importantly prevents overcooking or burning, for example, if the liquid in the vessel should boil away. In such automatic surface controlled units the temperature of the vessel being heated should be accurately determined. Accordingly, temperature sensing units have been employed generally at the center of the surface unit, but in the past many of these have been unsatisfactory in that they have failed to accurately determine the temperature of the vessel or have had a considerable time lag in sensing the temperature.

Accordingly an object of the invention is to provide a temperature sensing unit for a surface unit which will accurately determine the temperature of a vessel heated on the surface unit and with no appreciable time lag.

Still another object of the invention is to provide a rugged and simple temperature sensing unit, which is consistent in operation and one using solid non-telescoping connections inside the unit to prevent breakage of wires.

Still another object of the invention is to provide a temperature sensing unit for a surface unit which is small and effectively heat insulated from the temperature of the surface unit itself and yet rapidly repsonsive to change of temperature of the vessel by having a small heat mass.

Still another object of the invention is to provide a temperature sensing unit for a range surface unit wherein the sensing unit may be used with many different manufactured types of surface units and not interfere with the operation or cleaning of any such surface unit and also to provide a ready means of mounting the sensing unit which is compatible with all surface units.

Other objects and a fuller understanding of the invention may be had by referring to the following description and claims, taken in conjunction with the accompanying drawings, in which:

Figure 1:
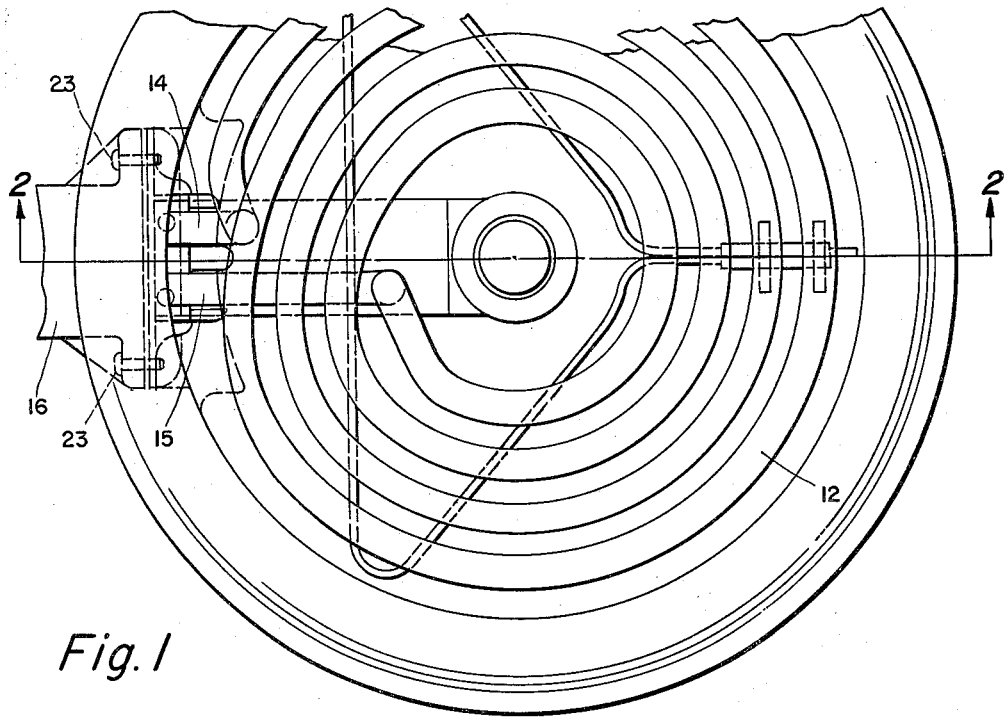
FIGURE 1 is a partial top view of a range surface unit with which the temperature sensing unit of the invention may be used.
Figure 2:
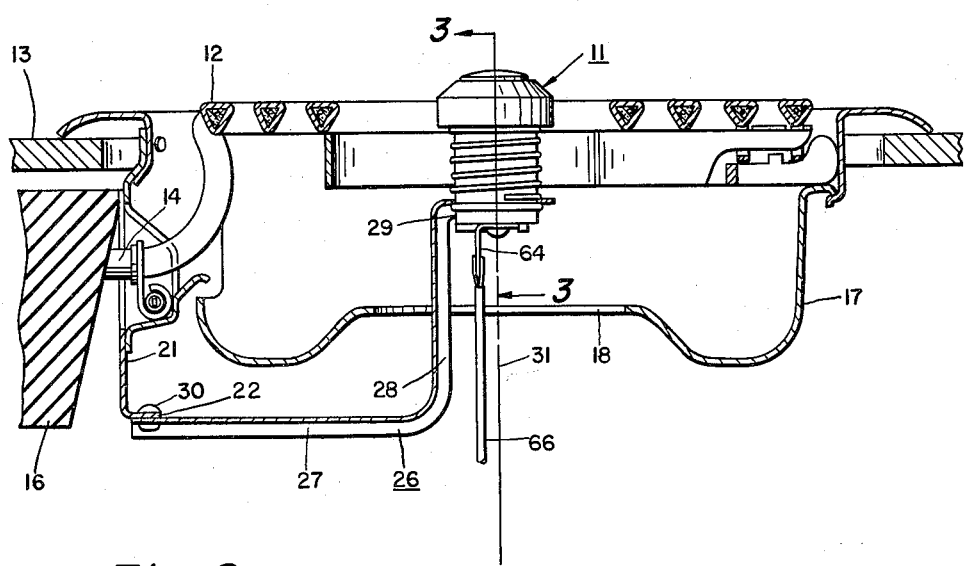
FIGURE 2 is a sectional view on line 2—2 of FIGURE 1.
Figure 3:
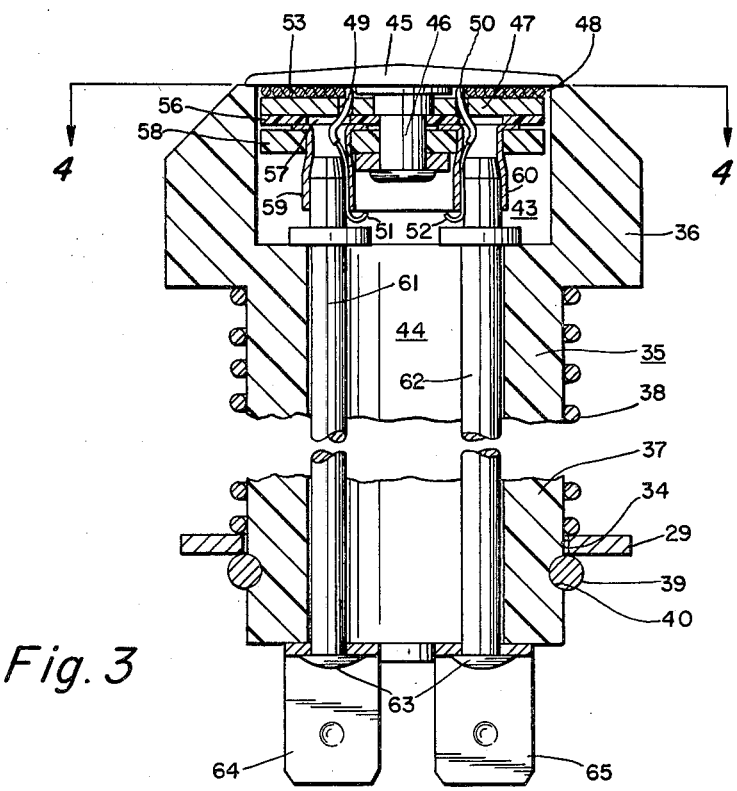
FIGURE 3 is an enlarged sectional view on line 3—3 of FIGURE 2.

The invention is shown in FIGURES 1 and 2 as a temperature sensing unit indicated generally at 11 which may be used with a surface heating unit 12 shown as an electrical heating unit, and mounted on the frame 13 or top of some form of range, such as a household electric range. The surface heating unit 12 may be of any desired construction and is shown as being of generally spiral configuration having first and second ends 14 and 15 which are mechanically connected to a terminal block 16 carried on the frame 13. This terminal block 16 may provide a flexible electrical permanent connection to the surface heating unit 12 or may provide a disconnectable electrical connection for the heating unit 12. There are two such general types of heating units 12 currently on the market and in one the heating unit 12 may be completely removed from the range for cleaning and in others this heating unit 12 may merely be swung out of the way through an arc so that a drip pan 17 underneath the heating unit 12 may be cleaned. The present invention of a temperature sensing unit 11 may be used with either type. The drip pan 17 is supported in some manner from the frame 13 below the surface heating unit 12 and includes a central aperture 18.

The temperature sensing unit 11 includes a flat thin plate support 21 which has an L-shaped bottom extension 22. The plate support 21 is thin enough to be mounted at the terminal block 16 by the same screws 23 which mount this terminal block 16. This provides for a convenient mounting of the entire sensing unit 11 by the same means which support the heating unit 12 at the terminal block 16.

A relatively rigid bracket 26 has first, second and third leg portions 27, 28 and 29, respectively, and the end of the first leg portion 27 is fixedly attached to the L-shaped extension 22 by any suitable means, such as the rivets 30. The first leg portion 27 extends generally horizontally under the drip pan 17 and the second leg portion 28 extends generally vertically upwardly through the drip pan aperture 18. This places the third leg portion 29 at a level above the drip pan 17 and it extends generally horizontally underneath the center or axis 31 of the heating unit 12.

Figure 4:
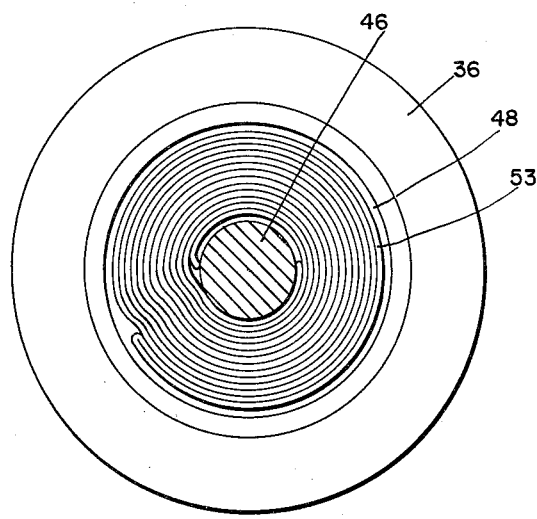
FIGURE 4 is a sectional view on line 4—4 of FIGURE 3.

The third leg portion 29 has a surface defining an aperture 34 on this axis 31. An insulator sensor body 35 has a flanged head 36 and a longitudinally extending shank 37. This shank 37 is cylindrical and is slidably received in the third leg portion 29. A coil compression spring 38 surrounds the shank 37 and engages the head 36 and the third leg portion 29 to urge upwardly the sensor body 35. A snap ring 39 engages a groove 40 in the lower end of the shank 37 so as to retain the body 35 within the bracket 26. A coaxial recess 43 is provided in the upper end of the head 36 and the shank 37 is longitudinally apertured at 44. A metal cap 45 of good heat conductivity is provided at the upper end of the head 36 and a stem 46 is attached to the cap 45. A metal backup washer 47 is received on the stem 46 and defines with the underside of the cap 45 an annular wire space 48. Both the cap 45 and the backup washer 47 may be made of aluminum, for example. The metal backup washer 47 has first and second apertures 49 and 50 closely adjacent the stem 46. First and second wire ends 51 and 52 of a resistance wire 53 pass through these apertures 49 and 50 and this resistance wire 53 is wrapped as a doubled wire in a pancake coil in a single axial thickness in the annular wire space 48. This configuration is best shown in FIGURE 4. This wrapping as a double spiral assures that the two wire ends 51 and 52 may be at the inner periphery of the coiled resistance wire 53 without any crossovers of the wire and also assures that all of the wire 53 is completely used in the coil in the wire space 48 without having to cut off any of the length of the wire 53 which otherwise might not have gone one more turn around the outer periphery of this coil of wire. This assures accuracy in length of the wire 53, and hence, accuracy of the resistance thereof.

An insulating washer 56 abuts the metal backup washer 47 and it also has apertures 57 for the wire ends 51 and 52 to pass through. An insulating eyelet support washer 58 carries first and second eyelets 59 and 60 and the heads of these eyelets are disposed between the insulating washer 56 and the eyelet support washer 58 for mutual insulation as well as support of these eyelets. First and second terminal pins 61 and 62 are longitudinally disposed in the body 35 and pass through the longitudinal aperture 44. These terminal pins 61 and 62 are solid and non-telescoping and are received in the eyelets 59 and 60, respectively, and frictionally grip the wire ends 51 and 52 by being wedged into the eyelets. The terminal pins extend to the lower end of the body shank 37 and are headed at 63 to receive blade type terminals 64 and 65. These terminals 64 and 65 thus provide external electrical connections to the resistance wire 53 through flexible leads 66.

The insulator sensor body 35 has a relatively small physical size and being made of good heat insulation receives a minimum of heat from the surface heating unit 12. The normal position of the sensor body 35 places the metal cap 45 above the level of the heating unit 12, and thus, when any vessel is placed on the heating unit this compresses the spring 38. The urging of this spring 38 maintains the cap 45 in engagement with the vessel for good heat transmissibility to the cap 45. The resistance wire 53 may be insulated with glass insulation which provides excellent electrical insulation with a minimum of thickness, yet the homogeneity provides relatively good heat conductivity to the wire itself. Actually only a low voltage need be applied to the resistance wire 53, and accordingly, only low voltage insulation is required. Also the good heat conductivity of the metal cap 45 and the metal backup washer 47, since they are made of aluminum, and the single layer of resistance wire in intimate contact therebetween, contribute to the rapid heat response of the resistance wire 53. This means that the resistance of this wire 53 readily follows the change in temperature of the vessel being heated by the surface unit 12. Accordingly, the resistance of the resistance wire changes quite appreciably, in the order of 2½ to 1 over the temperature range from room temperature to high cooking temperatures.

The entire temperature sensing unit 11 is rugged, simple and dependable, since no flexible wires are utilized inside the sensor body 35 which might break upon repeated flexing.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A temperature sensing unit for use with a surface unit supported on a frame, said temperature sensing unit, comprising, in combination, a relatively rigid bracket adapted to be fixedly mounted at one end relative to said frame and having first, second and third interconnected leg portions, said first leg portion extending generally horizontally toward the center of said surface unit, said second leg portion extending upwardly and said third leg portion extending generally horizontally under the center of said surface unit, a sensor body having a flanged head and having a depending shank carried in said third leg portion, a temperature sensing cap on the upper end of said head, spring means urging said cap toward a level above the level of the surface unit, first and second solid and non-telescoping electrical connection means passing longitudinally through said sensor body from said temperature sensing cap, and first and second terminals fastened to the lower end of said body shank and electrically connected to said first and second electrical connection means, respectively.

2. A temperature sensing unit for a vessel heated on a surface unit supported on a frame, said temperature sensing unit comprising, in combination, a relatively rigid bracket having first, second and third interconnected leg portions with one end of said first leg portion adapted to be fixedly mounted relative to said frame, said first leg portion extending generally horizontally toward the center of said surface unit, said second leg portion extending upwardly and said third leg portion extending generally horizontally under the center of said surface unit, a sensor body having a flanged head and having a depending shank carried in said third leg portion, a metal cap disposed adjacent the upper end of said head, spring means urging said cap to engage the underside of any vessel on the surface unit, means cooperating with the underside of said cap to define an annular wire space, a resistance wire having first and second ends and coiled in said annular wire space, first and second terminals fastened to the lower end of said body shank, and solid and non-telescoping means electrically connecting said first and second wire ends, respectively, to said first and second terminals.

3. A temperature sensing unit for a vessel heated on a surface unit adapted to have a centrally apertured drip pan thereunder and supported on a frame, said temperature sensing unit comprising, in combination, a support adapted to be fixedly mounted relative to said frame, a relatively rigid bracket fastened at one end to said support and having first, second and third interconnected leg portions, said first leg portion extending horizontally under any said drip pan, said second leg portion extending upwardly through the central aperture in any said drip pan, said third leg portion extending generally horizontally under the center of said surface unit, a sensor body having a flanged head and having a depending shank, surface means slidably receiving said body shank relative to said third leg portion for generally vertical movement, a recess in the head of said body, a metal cap on the upper end of said head and disposed adjacent said recess, spring means urging said cap to engage the underside of any vessel on the surface unit, means cooperating with the underside of said cap to define an annular wire space, a resistance wire having first and second ends and wrapped in a pancake coil in a single axial thickness in said annular wire space, and solid and non-telescoping electrical connection means passing longitudinally through said sensor body from said first and second wire ends.

4. A temperature sensing unit for a vessel heated on a surface unit having a centrally apertured drip pan thereunder and connected at a terminal block to a frame, said temperature sensing unit, comprising, in combination, a support adapted to be fixedly mounted relative to said terminal block, a relatively rigid bracket fastened at one end to said support and having first, second and third interconnected leg portions, said first leg portion extending generally horizontally under said drip pan, said second leg portion extending upwardly through the central aperture in said drip pan, said third leg portion extending generally horizontally under the center of said surface unit, an insulator sensor body having a flanged head and having a depending shank, surface means slidably receiving said body shank relative to said third leg portion for generally vertical movement, a recess in the head of said body, a metal cap on the upper end of said head and disposed adjacent said recess, spring means urging said cap to engage the underside of any vessel on the surface unit, a metal back-up plate spaced from the underside of said cap to define an annular wire space, a resistance wire having first and second ends and wrapped in a pancake coil in a single axial thickness in said annular wire space, an eyelet support disposed in said recess, first and second eyelets insulatedly carried in said eyelet support, and first and second terminal pins passing longitudinally through said sensor body from the lower end of said body shank to said recess in said body head and engaging said first and second eyelets, respectively, with said first and second wire ends electrically connected to the respective terminal pin and eyelet.

5. A temperature sensing unit for a vessel heated on a surface unit having a centrally apertured drip pan thereunder and connected at a terminal block to frame, said temperature sensing unit comprising, in combination, a support adapted to be fixedly mounted relative to said terminal block, a relatively rigid bracket fastened at one end to said support and having first, second and third interconnected leg portions, said first leg portion extending generally horizontally under said drip pan, said second leg portion extending upwardly through the central aperture in said drip pan, said third leg portion extending generally horizontally under the center of said surface unit, an aperture in said third leg portion substantially on the vertical axis of said surface unit, an insulator sensor body having a flanged head and having a depending shank slidably received in said third leg portion aperture, spring means acting between said third leg portion and said sensor body to urge said body upwardly, a recess in the head of said body, a metal cap on the upper end of said head and disposed adjacent said recess, said cap being urged by said spring means to engage the underside of any vessel on the surface unit, a metal back-up plate spaced from the underside of said cap to define an annular wire space, a resistance wire having first and second ends and wrapped as a doubled wire in a pancake coil in a single axial thickness in said annular wire space, an eyelet support in said recess, first and second eyelets insulatedly carried in said eyelet support, and first and second terminal pins passing longitudinally through said sensor body from the lower end of said body shank to said recess in said body head and engaging said first and second eyelets, respectively, with said first and second wire ends electrically connected to the respective terminal pin and eyelet.

6. A temperature sensing unit for a vessel heated on a surface unit having a centrally apertured drip pan thereunder and connected at a terminal block to a frame, said temperature sensing unit comprising, in combination, a support adapted to be fixedly mounted relative to said terminal block, a relatively rigid bracket fastened to one end of said support and having first, second and third interconnected leg portions, said first leg portion extending generally horizontally under said drip pan, said second leg portion extending upwardly through the central aperture in said drip pan, said third leg portion extending generally horizontally under the center of said surface unit, an aperture in said third leg portion substantially on the vertical axis of said surface unit, an insulator sensor body having a flanged head and having a depending shank slidably received in said third leg portion aperture, spring means acting between said third leg portion and said sensor body to urge said body upwardly, a substantially coaxial recess in the head of said body, a metal cap on the upper end of said head and having a stem substantially coaxially disposed in said recess, said cap being urged by said spring means to engage the underside of any vessel on the surface unit, a metal back-up washer fitted over said stem and spaced from the underside of said cap to define an annular wire space, a resistance wire having first and second ends and wrapped as a doubled wire in a pancake coil in a single axial thickness in said annular wire space, an eyelet support disposed in said recess, first and second eyelets insulatedly carried in said eyelet support, first and second solid terminal pins passing longitudinally through said sensor body from the lower end of said body shank to said recess in said body head and engaging said first and second eyelets, respectively, with said first and second wire ends electrically connected to the respective terminal pin and eyelet, and first and second terminals fastened to said first and second terminal pins exterior of the lower end of said body shank for external electrical connection to said resistance wire.

7. A temperature sensing unit for a vessel heated on a surface unit having a centrally apertured drip pan thereunder and connected at a terminal block to a stove top, said temperature sensing unit comprising, in combination, a flat thin plate support adapted to be fixedly mounted relative to said terminal block, a relatively rigid bracket fastened at one end to said plate support and having first, second and third interconnected leg portions, said first leg portion extending substantially horizontally under said drip pan, said second leg portion extending substantially vertically upwardly through the central aperture in said drip pan, said third leg portion extending substantially horizontally under the center of said surface unit, an aperture in said third leg portion substantially on the vertical axis of said surface unit, an insulator sensor body having a flanged head and having a depending shank slidably received in said third leg portion aperture, a compression spring surrounding said shank and acting between said third leg portion and said flanged head to urge said body upwardly, means engaging said body shank below said third leg portion and engageable with the underside of said third leg portion to retain said sensor body in said aperture in said third leg portion, a coaxial recess in the head of said body, a metal cap of good heat conductivity on the upper end of said head and having a stem coaxially disposed in said recess, said cap urged by said compression spring toward a position above the level of the surface unit to engage the underside of any vessel on the surface unit, a metal back-up washer of good heat conductivity fitted over said stem and spaced from the underside of said cap to define an annular wire space, aperture means in said back-up washer, a resistance wire having the two ends thereof passed through said aperture means and wrapped in a pancake coil in a single axial thickness in said annular wire space, an insulating washer disposed on said stem against the underside of said back-up washer and having aperture means through which said wire ends are passed, an eyelet support washer disposed on said stem against the underside of said insulating washer, first and second eyelets insulatedly carried in said eyelet support washer, first and second solid terminal pins passing longitudinally through said sensor body from the lower end of said body shank to said recess in said body head and engaging said first and second eyelets, respectively, with said two wire ends electrically connected with the respective terminal pin and eyelet, and first and second terminals fastened to said first and second terminal pins exterior of the lower end of said body shank for external electrical connection to said resistance wire.

8. A temperature sensing unit for a vessel heated on a surface unit having a centrally apertured drip pan thereunder and connected at a terminal block to a stove top, said temperature sensing unit comprising, in combination, a flat thin plate support adapted to be fixedly mounted relative to said terminal block, a relatively rigid bracket fastened at one end to said plate support and having first, second and third interconnected leg portions, said first leg portion extending substantially horizontaly under said drip pan, said second leg portion extending substantially vertically upwardly through the central aperture in said drip pan, said third leg portion extending substantially horizontally under the center of said surface unit, an aperture in said third leg portion substantially on the vertical axis of said surface unit, an insulator sensor body having a flanged head and having a cylindrical depending shank slidably received in said third leg portion aperture, a compression spring surrounding said shank and acting between said third leg portion and said flanged head to urge said body upwardly, a snap ring engaging a groove in said body shank below said third leg portion and engageable with the underside of said third leg portion to retain said sensor body in said aperture in said third leg portion, a coaxial recess in the head of said body, an aluminum cap on the upper end of said head and having a stem coaxially disposed in said recess, said cap normally disposed above the level of the surface unit by urging of said compression spring to engage the the underside of any vessel on the surface unit, an aluminum back-up washer fitted over said stem and spaced from the underside of said cap to define an annular wire space, two wire apertures in said back-up washer, a resistance wire having the two ends thereof passed through said two wire apertures and wrapped in a pancake coil in a single axial thickness in said annular wire space, a mica washer disposed on said stem against the underside of said back-up washer and having apertures through which said wire ends are passed, an insulating eyelet support washer disposed on said stem against the underside of said mica washer, first and second eyelets in said eyelet support washer, first and second solid terminal pins passing longitudinally through said sensor body from the lower end of said body shank to said recess in said body head and engaging said first and second eyelets, respectively, with said two wire ends mechanically gripped between each terminal pin and the respective eyelet, and first and second terminals fastened to said first and second terminal pins exterior of the lower end of said body shank for external electrical connection to said resistance wire.

9. A temperature sensing unit for use with a surface unit supported on a frame, said temperature sensing unit comprising, in combination, a relatively rigid bracket adapted to be fixedly mounted relative to said frame, a sensor body having a flanged head and having a depending shank and carried in said bracket generally at the center of said surface unit, a temperature sensing cap on the upper end of said head, spring means urging said cap relative to said bracket toward a level above the level of the surface unit, first and second solid and non-telescoping electrical connection means passing longitudinally through said sensor body from said temperature sensing cap, and first and second terminals fastened to the lower end of said body shank and electrically connected to said first and second electrical connection means, respectively.

10. A temperature sensing unit for a vessel heated on a surface unit supported on a frame, said temperature sensing unit comprising, in combination, a relatively rigid bracket adapted to be fixedly mounted relative to said frame and extending generally toward the center of said surface unit, a sensor body carried on said bracket at the center of said surface unit, a metal cap on the upper end of said body, spring means urging said cap relative to said bracket to engage the underside of any vessel on the surface unit, means cooperating with the underside of said cap to define an annular wire space, a resistance wire having first and second ends and wrapped in said annular wire space, and solid and non-telescoping electrical connection means passing through said sensor body from said first and second wire ends for external connection to said resistance wire.

References Cited in the file of this patent

UNITED STATES PATENTS

| | | |
|---|---|---|
| 2,463,984 | Lederer | Mar. 8, 1949 |
| 2,602,132 | Young | July 1, 1952 |
| 2,703,833 | Vanvor | Mar. 8, 1955 |
| 2,813,962 | Skala | Nov. 19, 1957 |
| 2,980,875 | Sivacek | Apr. 18, 1961 |
| 2,988,625 | Hart | June 13, 1961 |
| 3,037,179 | Otto | May 29, 1962 |